United States Patent
Takahashi

(10) Patent No.: US 8,040,672 B2
(45) Date of Patent: Oct. 18, 2011

(54) MOBILE TERMINAL DEVICE EQUIPPED WITH DISPLAY

(75) Inventor: Daisuke Takahashi, Osaka (JP)

(73) Assignee: Kyocera Corporation, Kyoto (JP)

( * ) Notice: Subject to any disclaimer, the term of this patent is extended or adjusted under 35 U.S.C. 154(b) by 392 days.

(21) Appl. No.: 12/411,095

(22) Filed: Mar. 25, 2009

(65) Prior Publication Data

US 2009/0244853 A1    Oct. 1, 2009

(30) Foreign Application Priority Data

Mar. 28, 2008   (JP) ................. 2008-085425

(51) Int. Cl.
*H05K 5/00* (2006.01)
*H04M 1/00* (2006.01)
*G09G 5/00* (2006.01)

(52) U.S. Cl. ......... 361/679.55; 361/679.56; 361/679.01; 455/575.1; 455/575.3; 455/575.4; 455/575.8; 455/566; 345/156

(58) Field of Classification Search ............... 455/575.1, 455/575.3, 575.4, 575.8, 550.1, 566, 90.1–90.3, 455/128, 347–351; 345/156, 157, 168, 169; 361/679.01–679.45, 679.55–679.59
See application file for complete search history.

(56) References Cited

U.S. PATENT DOCUMENTS

| | | | | |
|---|---|---|---|---|
| 5,548,430 A | * | 8/1996 | Kuo | 349/153 |
| 6,151,207 A | * | 11/2000 | Kim | 361/679.26 |
| 6,532,152 B1 | * | 3/2003 | White et al. | 361/692 |
| 6,594,143 B2 | * | 7/2003 | Yano et al. | 361/679.26 |
| 7,764,933 B2 | * | 7/2010 | Tempelman et al. | 455/90.3 |
| 2004/0248619 A1 | * | 12/2004 | Graiger et al. | 455/566 |

FOREIGN PATENT DOCUMENTS

| | | |
|---|---|---|
| JP | 09-283950 | 10/1997 |
| JP | 11-298157 | 10/1999 |
| JP | 2003-110670 | 4/2003 |
| JP | 2004-180271 | 6/2004 |
| JP | 2006-130697 | 5/2006 |
| JP | 2007-033658 | 2/2007 |
| WO | 2005/069711 A1 | 7/2005 |

OTHER PUBLICATIONS

Office Action dated Nov. 30, 2010 issued by the Japanese Patent Office for the corresponding Japanese Patent Application No. 2008-085425.

* cited by examiner

*Primary Examiner* — Jayprakash N Gandhi
*Assistant Examiner* — Nidhi Desai
(74) *Attorney, Agent, or Firm* — Procopio, Cory, Hargreaves & Savitch LLP

(57) ABSTRACT

An organic EL display formed by welding a lid body and a substrate is arranged in a recessed surface of a cabinet; and at least two cushions are arranged between a bottom surface of the recessed surface and the substrate, the cushions being spaced apart from each other along a longitudinal direction of the cabinet. A friction reducing layer, which friction with the substrate of the organic EL display is small, is formed on the cushion, and the substrate is slidable on the cushion.

3 Claims, 4 Drawing Sheets

MOBILE TERMINAL DEVICE EQUIPPED WITH DISPLAY

BACKGROUND OF THE INVENTION

1. Field of the Invention

The present invention relates to a mobile terminal device equipped with a display, specifically, to a mobile terminal device configured by attaching a thin organic EL display.

2. Description of the Related Art

FIG. 5 is a perspective view of a mobile telephone serving as a mobile terminal device (1) previously disclosed by the applicant. A cabinet (2) equipped with a display (5) is arranged on a supporting box (7) to be slidable in a direction of an arrow D. Operation buttons (70) (70) are arranged on the supporting box (7), so that the device (1) can be operated at an open position in which the operation buttons (70) (70) are exposed.

A device equipped with an organic EL display (5) is disclosed for the display (5) in recent years in view of beauty, thinness, and the like of an image. FIG. 6 is a cross-sectional view of FIG. 5 taken along a perpendicular plane including line A-A. A first recessed surface (20) is formed on an upper surface of the cabinet (2), and a second recessed surface (21) is formed in the first recessed surface (20). At the open position of the cabinet (2), an upper surface end (71) of the supporting box (7) is positioned on a lower side of the display (5), and a rear wall (22) of the cabinet (2) comes into contact with the upper surface end (71) of the supporting box (7).

A transparent cover (4) called a screen made from reinforced glass is attached to the first recessed surface (20), and the organic EL display (5) is fixed to the lower surface of the transparent cover (4) with an adhesive called SVR (Super View Resin). The organic EL display (5) is arranged in the second recessed surface (21).

One sheet of cushion (3) is arranged between the lower surface of the organic EL display (5) and a bottom surface of the second recessed surface (21), and the cushion (3) is attached to both the lower surface of the organic EL display (5) and the upper surface of the rear wall (22). The cushion (3) extends over the entire longitudinal direction of the display (5).

As shown enlarged in FIG. 7, the organic EL display (5) is formed by covering a glass lid body (52), which is formed with a recessed portion (51) at the lower surface, on a glass substrate (50), and glass welding (53) the peripheral edge portion of the lid body (52). The glass (53) for welding has a lower melting point than the glass configuring the lid body (52) and the substrate (50).

A back electrode (54) serving as a cathode is vapor deposited on the substrate (50), and an electron-injection layer, an electron transport layer, a light emission layer, a hole transport layer, a hole injection layer, and an anode (all of which are not shown) positioned in the recessed portion (51) are formed thereon. An interior of the recessed portion (51) is filled with inactive gas to prevent oxidation of the back electrode (54). If the back electrode (54) is oxidized, an image cannot be correctly displayed, and thus the peripheral edge portion of the substrate (50) and the lid body (52) need to be strongly welded (53) to maintain a sealed state so that air does not flow in from the welded portion (53).

It is found, however, that the following points in the above-described mobile terminal device need to be improved.

As shown in FIG. 6, when a downward force is applied to a distal end of the cabinet (2) by a hand of a user at the open position, a bending moment M generates with the end (71) of the supporting box (7) as a center. This bending moment M may cause the rear wall (22) to deflect with a projecting surface facing upward. The cushion (3) is attached to both the lower surface of the organic EL display (5) and the upper surface of the rear wall (22), and is arranged over the entire longitudinal direction of the display (5), and thus the deflection of the rear wall (22) transmits to the cushion (3) as is thereby deflecting the entire cushion (3). Such deflection is transmitted to the organic EL display (5), whereby a force of detaching the welding of the substrate (50) and the lid body (52) of the organic EL display (5) acts. The welded portion (53) thereby detaches, air flows into the recessed portion (51), and an image may not be correctly displayed.

It is an object of the present invention to provide a device capable of maintaining a sealed state of the organic EL display (5) and correctly displaying an image even if a bending moment M is applied on the cabinet (2).

SUMMARY OF THE INVENTION

A mobile terminal device of the present invention has a display (5) formed by welding a lid body (52) and a substrate (50) arranged in a recessed surface (21) of a cabinet (2). At least two cushions (3) (3) are arranged spaced apart from each other along a longitudinal direction of the cabinet (2) between a bottom surface of the recessed surface (21) and the substrate (50).

DETAILED DESCRIPTION OF THE PREFERRED EMBODIMENTS

One example of the present invention will be described below with reference to the drawings.

Figure 1:
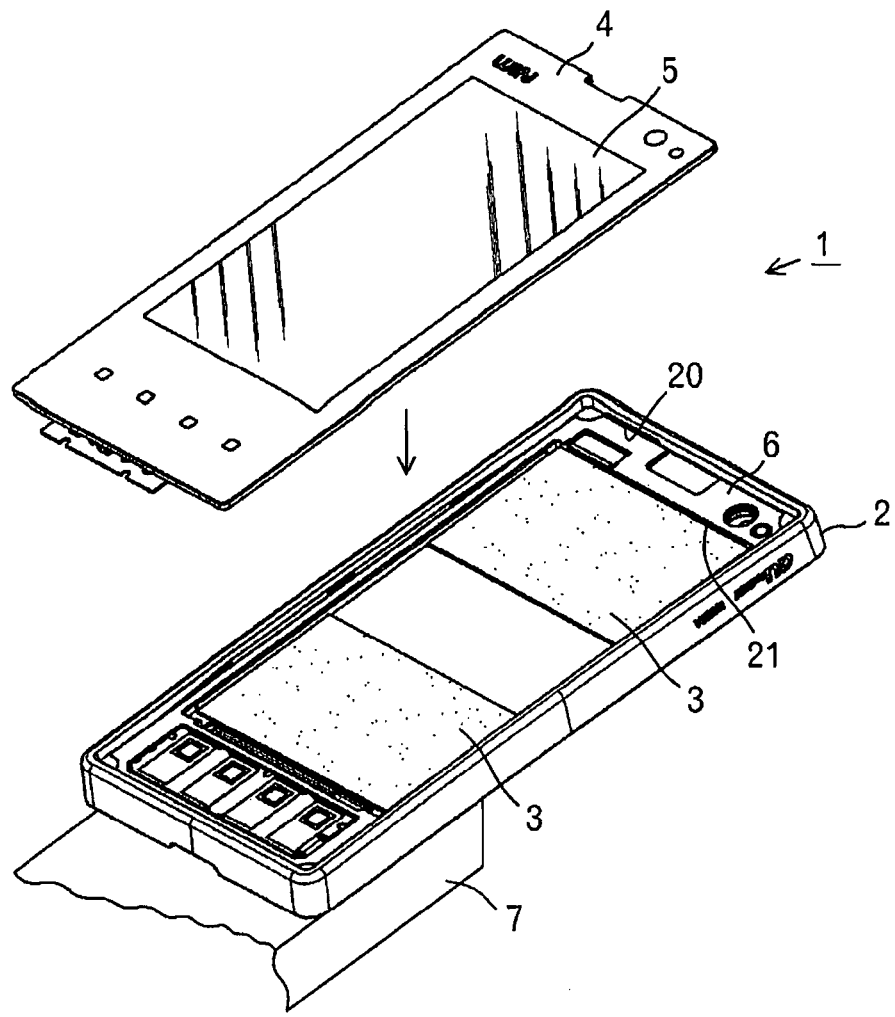
FIG. 1 is an exploded perspective view of a cabinet and a transparent cover.
Figure 2:
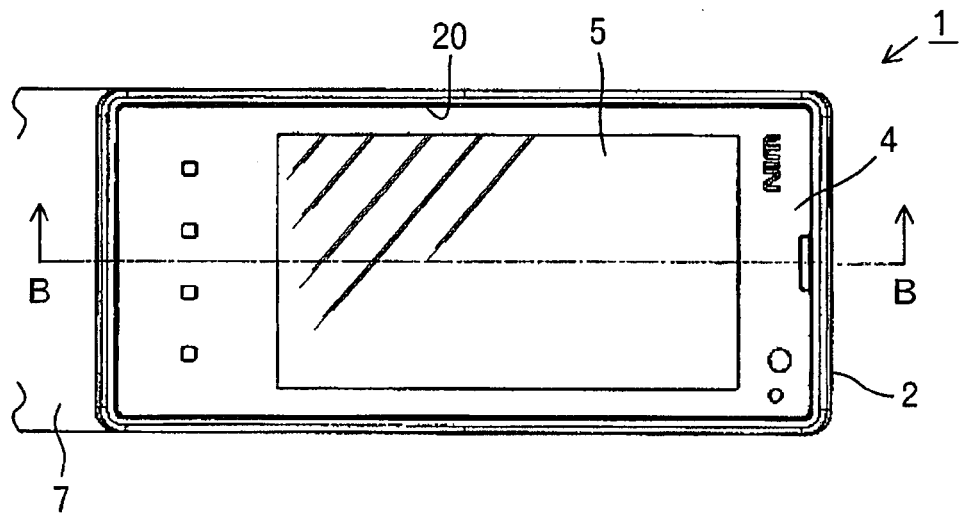
FIG. 2 is a plan view of the cabinet and the transparent cover.
Figure 5:
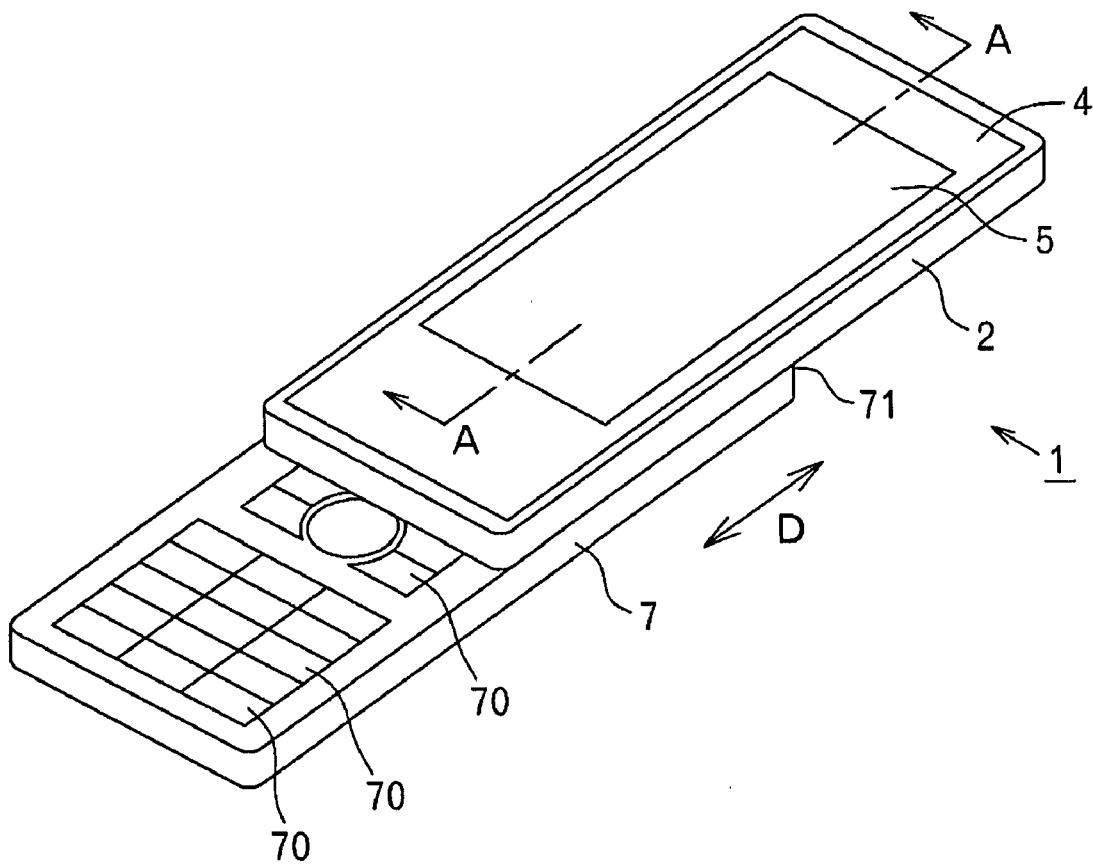
FIG. 5 is a perspective view of a conventional mobile telephone.
Figure 6:
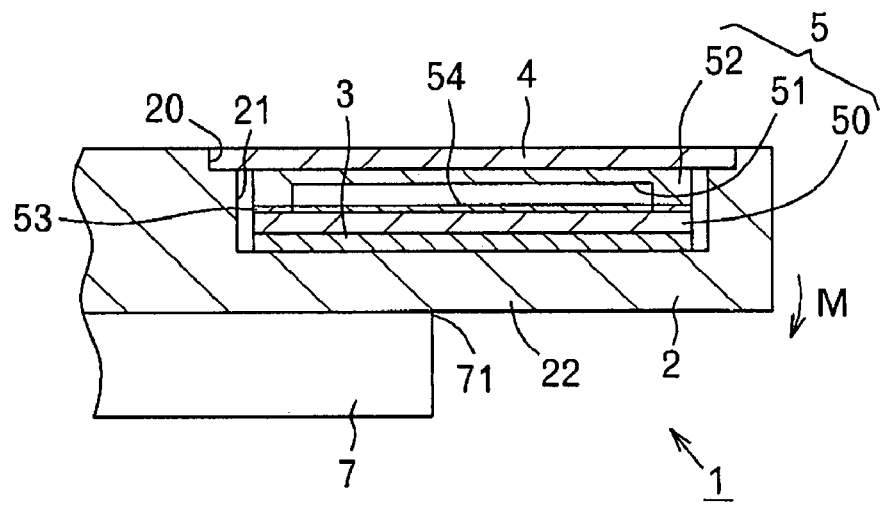
FIG. 6 is a cross-sectional view of FIG. 5 taken along a perpendicular plane including line A-A.
Figure 7:
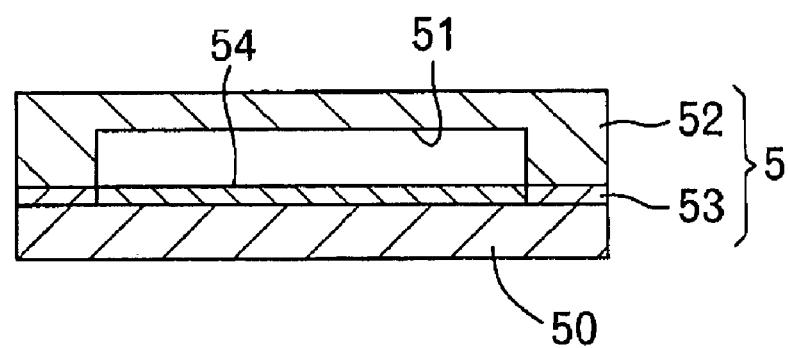
FIG. 7 is an enlarged cross-sectional view of an organic EL display.

FIG. 1 is an exploded perspective view of a cabinet (2) and a transparent cover (4), and FIG. 2 is a plan view of the cabinet (2) and the transparent cover (4). A configuration in which the cabinet (2) is slidably arranged on a supporting box (7) is the same as a conventional configuration shown in FIG. 5. An organic EL display (5) is also the same in being formed by glass welding a substrate (50) and a lid body (52).

The cabinet (2) has a rectangular shape, where a first recessed surface (20) is formed on an upper surface, and a second recessed surface (21) is formed in the first recessed surface (20). The cabinet (2) is made of magnesium, but may be made from other metals.

Two sheets of cushion (3) (3) are adhered to the bottom surface of the second recessed surface (21) while being spaced apart from each other along a longitudinal direction of the cabinet (2) (or the display (5)), where the cushion (3) is not arranged at the middle in the longitudinal direction of the second recessed surface (21). In other words, each cushion (3) (3) faces the ends of the display (5) along the longitudinal direction of the cabinet (2).

In the first recessed surface (20), a double-sided adhesive tape (6) having a thickness of about 0.25 mm is attached to a peripheral edge portion that connects to the second recessed surface (21) so that the transparent cover (4) made from reinforced glass is attached to the peripheral edge portion of the second recessed surface (21) by the double-sided adhesive tape (6). The organic EL display (5) is fixed to a lower surface of the transparent cover (4) with an adhesive called SVR (Super View Resin). The organic EL display (5) is arranged in the second recessed surface (21) so that the lower surface contacts the cushion (3). As hereinafter described, the organic EL display (5) is not attached to the cushion (3).

Figure 3:
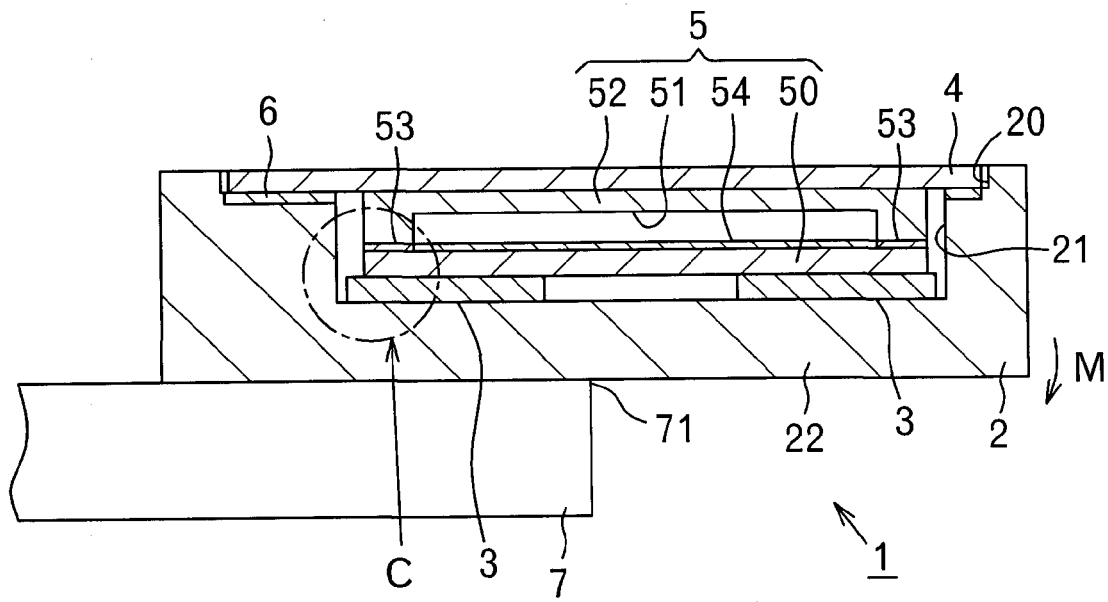
FIG. 3 is a cross sectional view of FIG. 2 taken along a perpendicular plane including line B-B.

FIG. 3 is a cross sectional view of FIG. 2 taken along a perpendicular plane including line B-B. In the cabinet (2), the bottom surface side of the second recessed surface (21) configures a rear wall (22) of the cabinet (2). When a force is applied downward on the cabinet (2) in an open position, a bending moment M having an end (71) as a center generates. This bending moment M may cause the rear wall (22) to deflect with a projecting surface facing upward.

However, the cushions (3) (3) are arranged spaced apart from each other along the longitudinal direction of the cabinet (2). The cushions (3) (3) are slidable with respect to the substrate (50), as hereinafter described. However, even if the cushions (3) (3) closely attach to the substrate (50), an entire deflection amount of the rear wall (22) does not transmit to the substrate (50) of the organic EL display (5) via the cushions (3) (3).

In other words, only the deflection amount of the portion of the rear wall (22) contacting the cushions (3) (3) transmits to the substrate (50) via the cushions (3) (3), and thus the entire deflection amount of the rear wall (22) does not transmit to the substrate (50). Therefore, detachment of the substrate (50) and the lid body (52) of the organic display (5) due to deflection of the rear surface of the cabinet (2) is alleviated or prevented, and a risk that an image is not correctly displayed can be prevented.

Furthermore, as described below, the deflection amount of the rear wall (22) can be prevented from being transmitted to the substrate (50) via the cushions (3) (3) by having the substrate (50) slidable with respect to the cushions (3) (3).

Sliding Structure of Substrate (50)

Figure 4:
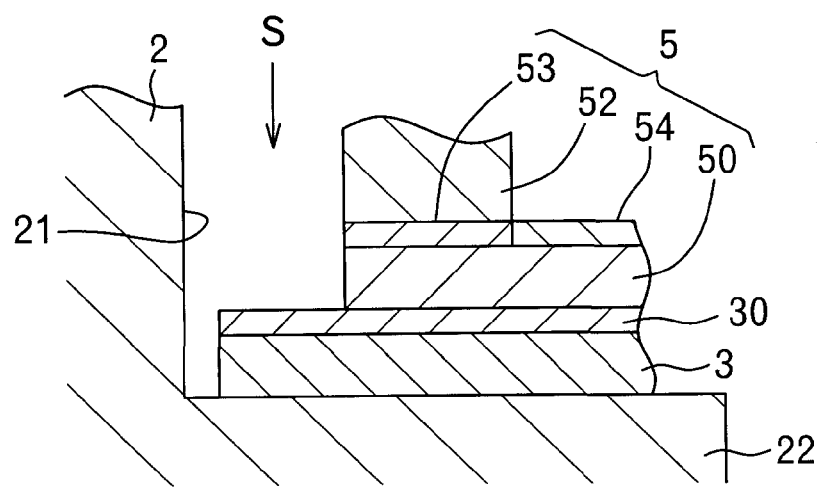
FIG. 4 is a view enlarging a portion C of FIG. 3.

FIG. 4 is a view enlarging a portion C of FIG. 3. A friction reducing layer (30) made of PET (polyethylene telephtalate) material is formed on the cushion (3), which friction reducing layer (30) is not adhered to the substrate (50) so that the friction reducing layer (30) is slidable with respect to the substrate (50). A spacing S is formed between the substrate (50) and a peripheral wall of the second recessed surface (21) so that the substrate (50) can slide on the cushion (3).

When a force is applied downward on the cabinet (2) and the bending moment M having the end (71) as the center generates, the rear wall (22) deflects with the projecting surface facing upward, and thus a force of pulling either to the left or the right acts on the cushion (3) in accordance with the upward deflection of the rear wall (22).

In this case, however, the force of pulling to the left or the right does not apply on the substrate (50) since the cushion (3) slides with respect to the substrate (50), that is, the organic EL display (5). In other words, the substrate (50) does not move following the rear wall (22) of the cabinet (2) since the substrate (50) and the cushion (3) slide with respect to each other. This also prevents detachment of the substrate (50) and the lid body (52) of the organic EL display (5).

In the present example, the deflection amount of the rear wall (22) is prevented from being transmitted to the substrate (50) of the organic EL display (5) by both separating the cushions (3) (3) from each other in the longitudinal direction of the cabinet (2) and allowing free sliding of the substrate (50) without attaching the substrate (50) on the cushion (3).

Since the rear wall (22) forms a part of the cabinet (2), the entire cabinet (2) deflects if that rear wall (22) deflects. The organic EL display (5) is attached to the transparent cover (4), and the transparent cover (4) is attached to the cabinet (2). Therefore, the deflection of the cabinet (2) may be transmitted to the organic EL display (5) via the transparent cover (4).

However, since the transparent cover (4) is attached to the cabinet (2) by the double-sided adhesive tape (6), as described above, the double-sided adhesive tape (6) acts as a buffer material when the cabinet (2) deflects so that the deflection of the cabinet (2) is not directly transmitted to the transparent cover (4). That is, the deflection of the cabinet (2) is absorbed by the thickness of the double-sided adhesive tape (6), thereby preventing detachment of the welding of the substrate (50) and the lid body (52) of the organic EL display (5).

That is, even when the bending moment M is applied on the cabinet (2), the moment transmitted from the transparent cover (4) to the organic EL display (5) is alleviated by the thickness of the double-sided adhesive tape (6) and an elasticity of the cured SVR.

Furthermore, the moment from the rear wall (22) is also less likely to be transmitted to the organic EL display (5) since the organic EL display (5) and the cushion (3) are not adhered, and the cushions (3) (3) are spaced apart from each other.

Accordingly, the deflection caused by the moment of the cabinet (2) is less likely to be transmitted to the organic EL display (5) although the transparent cover (4) is fixed to the cabinet (2) by the double-sided adhesive tape (6).

The number of cushions (3) (3) is not limited to two, and may be any number as long as they are spaced apart from each other.

What is claimed is:

1. A mobile terminal device having a cabinet with a longitudinal direction and a recessed surface with a bottom surface, comprising: a display including a lid body and a substrate welded together, wherein the display is positioned in the recessed surface of the cabinet; and at least two cushions spaced apart from each other along the longitudinal direction of the cabinet between the bottom surface of the recessed surface and the substrate; wherein the mobile terminal device further including a friction reducing layer formed on at least one cushion of the at least two cushions, wherein the friction reducing layer is positioned between the at least one cushion and the substrate and the friction reducing layer is slidable with respect to the substrate.

2. The mobile terminal device according to claim 1, wherein the display includes a first end and a second end, wherein at least a first cushion of the at least two cushions is positioned on the first end and at least a second cushion of the at least two cushions is positioned on the second end and wherein the at least first and second cushion are positioned along the longitudinal direction of the cabinet.

3. The mobile terminal device according to claim 1, wherein the recessed surface includes a peripheral edge portion and the mobile terminal device further includes a transparent cover that covers the recessed surface of the cabinet, the transparent cover including a peripheral edge portion and a lower surface;

the display is attached to the lower surface of the transparent cover; and
a tape attaching the peripheral edge portion of the transparent cover to the peripheral edge portion of the recessed surface, the tape having a buffering effect.

* * * * *